United States Patent
Leinonen et al.

(10) Patent No.: US 10,243,610 B2
(45) Date of Patent: Mar. 26, 2019

(54) RADIO ARRANGEMENT, RADIO APPARATUS, ANTENNA ARRANGEMENT AND METHODS PERFORMED THEREIN

(71) Applicant: Telefonaktiebolaget LM Ericsson (publ), Stockholm (SE)

(72) Inventors: Marko E. Leinonen, Haukipudas (FI); Kauko Heinikoski, Oulu (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/520,911

(22) PCT Filed: Nov. 28, 2014

(86) PCT No.: PCT/EP2014/075940
§ 371 (c)(1),
(2) Date: Apr. 21, 2017

(87) PCT Pub. No.: WO2016/082886
PCT Pub. Date: Jun. 2, 2016

(65) Prior Publication Data
US 2017/0338849 A1    Nov. 23, 2017

(51) Int. Cl.
*H04B 1/06*    (2006.01)
*H04B 1/401*   (2015.01)
(Continued)

(52) U.S. Cl.
CPC ............. *H04B 1/401* (2013.01); *H04B 1/40* (2013.01); *H04W 88/085* (2013.01)

(58) Field of Classification Search
CPC .......................... H04W 88/085; H04B 1/401
(Continued)

(56) References Cited

U.S. PATENT DOCUMENTS 8,121,539 B2 *  2/2012  Arkko ............. G06K 19/07749
                                                 340/572.1
2005/0250564 A1 * 11/2005 Kishigami ............. H04B 7/086
                                                 455/575.7
(Continued)

FOREIGN PATENT DOCUMENTS

CN    103891160 A    6/2014
WO    2010146471 A1  12/2010
WO    2012083668 A1  6/2012

OTHER PUBLICATIONS

International Search Report and Written Opinion for International Patent Application No. PCT/EP2014/075940, dated Mar. 16, 2015, 9 pages.

(Continued)

*Primary Examiner* — Sonny Trinh
(74) *Attorney, Agent, or Firm* — Withrow & Terranova, PLLC

(57) ABSTRACT

Embodiments herein relate to a radio arrangement for enabling communication in a wireless communication network, wherein the radio arrangement comprises at least two signal path configurations for transmitting and/or receiving signals to and/or from a radio device in the wireless communication network. The radio arrangement comprises a radio apparatus and an antenna arrangement connected to the radio apparatus. The radio arrangement is configured to obtain, at the radio apparatus, an indication, which indication is indicating a configuration of the antenna arrangement connected to the radio apparatus. The radio arrangement is further configured to select, for communication in the wireless communication network, a signal path configuration at the radio apparatus and/or the antenna arrangement of the at least two signal path configurations based on the obtained indication.

28 Claims, 13 Drawing Sheets

(51) Int. Cl.
*H04B 1/40* (2015.01)
*H04W 88/08* (2009.01)

(58) Field of Classification Search
USPC ............... 455/272, 562.1, 275, 277.1, 552.1
See application file for complete search history.

(56) References Cited

U.S. PATENT DOCUMENTS

2010/0297953 A1* 11/2010 Rofougaran ......... H04B 7/0689
455/73
2011/0021244 A1 1/2011 Karaoguz et al.
2013/0107763 A1 5/2013 Uyehara et al.

OTHER PUBLICATIONS

First Office Action for Chinese Patent Application No. 201480083670.2, dated Nov. 21, 2018, 27 pages.

* cited by examiner

RADIO ARRANGEMENT, RADIO APPARATUS, ANTENNA ARRANGEMENT AND METHODS PERFORMED THEREIN

This application is a 35 U.S.C. § 371 national phase filing of International Application No. PCT/EP2014/075940, filed Nov. 28, 2014, the disclosure of which is incorporated herein by reference in its entirety.

TECHNICAL FIELD

Embodiments herein relate to a radio arrangement, a radio apparatus, an antenna arrangement and methods performed therein. In particular, embodiments herein relate to enabling communication in a wireless communications network.

BACKGROUND

In a typical wireless communication network, wireless devices, also known as mobile stations and/or user equipments (UEs), communicate via a Radio Access Network (RAN) to one or more core networks. The RAN covers a geographical area which is divided into cell areas, with each cell area being served by a base station, e.g., a radio base station (RBS), which in some networks may also be called, for example, a "NodeB" or "eNodeB" (eNB). A cell is a geographical area where radio coverage is provided by the radio base station at a base station site or an antenna site in case the antenna and the radio base station are not collocated. Each cell is identified by an identity within the local radio area, which is broadcast in the cell. Another identity identifying the cell uniquely in the whole wireless communication network is also broadcast in the cell. One base station may have one or more cells. The base stations communicate over the air interface operating on radio frequencies with the wireless devices within range of the base stations.

A Universal Mobile Telecommunications System (UMTS) is a third generation mobile communication system, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for wireless devices. In a forum known as the Third Generation Partnership Project (3GPP), telecommunications suppliers propose and agree upon standards for third generation networks and UTRAN specifically, and investigate enhanced data rate and radio capacity. In some versions of the RAN as e.g. in UMTS, several base stations may be connected, e.g., by landlines or microwave, to a controller node, such as a Radio Network Controller (RNC) or a Base Station Controller (BSC), which supervises and coordinates various activities of the plural base stations connected thereto. The RNCs are typically connected to one or more core networks.

Specifications for the Evolved Packet System (EPS) have been completed within the 3$^{rd}$ Generation Partnership Project (3GPP) and this work continues in the coming 3GPP releases. The EPS comprises the Evolved Universal Terrestrial Radio Access Network (E-UTRAN), also known as the Long Term Evolution (LTE) radio access, and the Evolved Packet Core (EPC), also known as System Architecture Evolution (SAE) core network. E-UTRAN/LTE is a variant of a 3GPP radio access technology wherein the radio base stations are directly connected to the EPC core network rather than to RNCs. In general, in E-UTRAN/LTE the functions of a RNC are distributed between the radio base stations, called eNodeBs in LTE, and the core network. As such, the Radio Access Network (RAN) of an EPS has an essentially "flat" architecture comprising radio base stations without reporting to RNCs.

All known small cell RBSs, for e.g. pico cells, are using combined transmission and reception antennas. A schematic block diagram for a first pico RBS is shown in FIG. 1. There is an antenna connector after a duplex filter to connect combined transmission and reception antenna as a product integrated antenna or external antenna arrangement to radio solution. In FIG. 1, one of two Multiple Input Multiple Output (MIMO) branches is merely shown as for clarity purposes. A RF board in FIG. 1 comprises a dedicated transmission (TX) chain with a power amplifier (PA), and a dedicated reception (RX) chain. Signals are processed in a Digital Signal Processing unit.

A Pico RBS may implement dedicated transmission and reception antennas into the RBS. E.g. the pico RBS may support multiple frequency bands in one Radio Frequency (RF) apparatus and a block diagram for a RF solution with a dedicated antenna arrangement is shown in FIG. 2.

Transmission (TX) and reception (RX) signals may be radiated from and to a radio apparatus e.g. an RBS, a Pico RBS, a Radio Dot System (RDS) or a wireless device with a coupled antenna arrangement and there may be dedicated transmission and reception antennas for the TX and RX signals, respectively, or one common antenna may be used to transmit and receive signals. In some radio apparatuses there is need for use dedicated TX and RX antennas to improve filtering characteristics between transmission and reception signals and thus improve radio performance of the receiver of the radio apparatus. Additionally, if an external antenna is connected to each dedicated RX and TX ports of the radio apparatus the number of needed antennas is duplicated. For example, a radio base station that supports two RF bands with 2×2 MIMO, with dedicated integrated internal RX and TX antennas needs eight antenna ports, i.e. 2×2×2 dedicated antennas. Dedicated RX and TX antennas are used to improve internal antenna isolation and thus improve filtering characteristics between the different signals.

The usage of a common antenna or a combined transmission and reception antenna has the advantage that it will reduce the number of antennas and antenna connectors by 50% and thus reduce the needed cabling for external antennas due to fewer antenna connections.

Today's radio apparatuses either use dedicated RX and TX antennas or a common antenna, providing nonflexible solutions once one antenna configuration is selected.

SUMMARY

An object to embodiments herein is to provide a mechanism that enables usage of either dedicated antennas or a common antenna in a flexible manner.

According to an aspect the object is achieved by providing a radio arrangement for enabling communication in a wireless communication network. The radio arrangement comprises at least two signal path configurations for transmitting and/or receiving signals to and/or from a radio device in the wireless communication network. Furthermore, the radio arrangement comprises a radio apparatus and an antenna arrangement connected to the radio apparatus. The radio arrangement is configured to obtain, at the radio apparatus, an indication, which indication is indicating a configuration of the antenna arrangement connected to the radio apparatus. The radio arrangement is further configured to select, for communication in the wireless communication network, a signal path configuration at the radio apparatus and/or the antenna arrangement of the at least two signal path configurations based on the obtained indication.

According to another aspect the object is achieved by providing a radio apparatus for enabling communication in a wireless communication network. The radio apparatus being configured to obtain an indication, which indication is indicating configuration of an antenna arrangement connected to the radio apparatus. The radio apparatus further being configured to select, for communication in the wireless communication network, a signal path configuration, at the radio apparatus and/or the antenna arrangement, of at least two signal path configurations for transmitting and/or receiving signals to and/or from a radio device in the wireless communication network, based on the obtained indication.

According to yet another aspect the object is achieved by providing an antenna arrangement for enabling communication in the wireless communication network. The antenna arrangement is configured to connect to a radio apparatus to form a radio arrangement comprising at least two signal path configurations for transmitting and/or receiving signals to and/or from a radio device in the wireless communication network. The antenna arrangement is configured to signal an indication to the radio apparatus, which indication is indicating a configuration of the antenna arrangement and is enabling communication in the wireless communication network.

According to still another aspect the object is achieved by providing a method performed in a radio arrangement for enabling communication in the wireless communication network. The radio arrangement comprises at least two signal paths for transmitting and/or receiving signals to and/or from a radio device in the wireless communication network. The radio arrangement further comprises a radio apparatus and an antenna arrangement connected to the radio apparatus. The radio arrangement obtains, at the radio apparatus, an indication, which indication is indicating a configuration of the antenna arrangement connected to the radio apparatus. The radio arrangement selects, for communication in the wireless communication network, a signal path configuration at the radio apparatus and/or the antenna arrangement of the at least two signal path configurations based on the obtained indication.

According to yet still another aspect the object is achieved by providing a method performed in a radio apparatus for enabling communication in a wireless communication network. The radio apparatus obtains an indication, which indication is indicating a configuration of an antenna arrangement connected to the radio apparatus. The radio apparatus selects, for communication in the wireless communication network, a signal path configuration, at the radio apparatus and/or the antenna arrangement, of at least two signal path configurations for transmitting and/or receiving signals to and/or from a radio device in the wireless communication network, based on the obtained indication.

According to yet still another aspect the object is achieved by providing a method performed in an antenna arrangement for enabling communication in a wireless communication network. The antenna arrangement is configured to connect to a radio apparatus to form a radio arrangement comprising at least two signal path configurations for transmitting and/or receiving signals to and/or from a radio device in the wireless communication network. The antenna arrangement signals an indication to the radio apparatus, which indication is indicating a configuration of the antenna arrangement and is enabling communication in the wireless communication network.

Embodiments herein provide a radio arrangement that based on the indication indicating the configuration of the antenna arrangement may be modified from using dedicated antennas to using a common antenna or vice versa. This leads to a flexible solution where the antenna configuration may be changed in order to e.g. change radiation pattern or coverage.

BRIEF DESCRIPTION OF THE DRAWINGS

Embodiments will now be described in more detail in relation to the enclosed drawings, in which.

DETAILED DESCRIPTION

Figure 1:
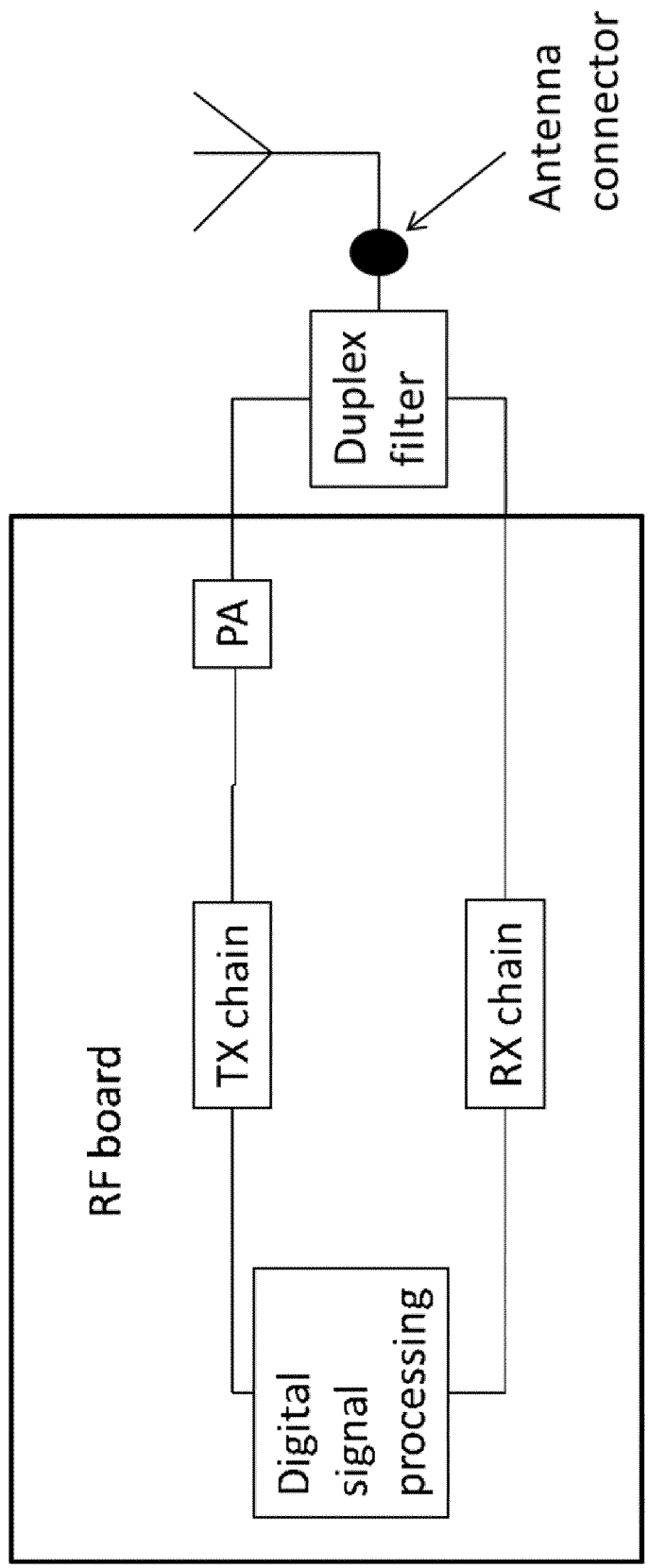
FIG. 1 shows a block diagram depicting a radio apparatus according to prior art.
Figure 2:
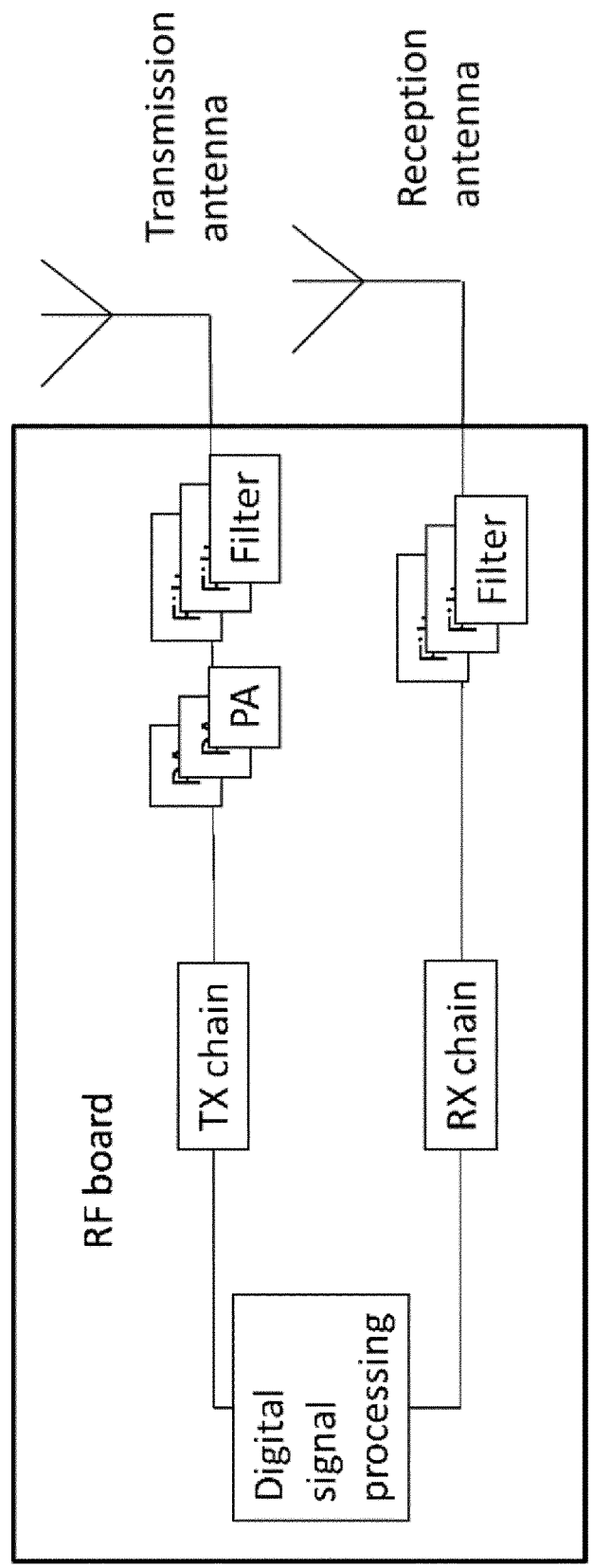
FIG. 2 shows a block diagram depicting a radio apparatus according to prior art.
Figure 3:
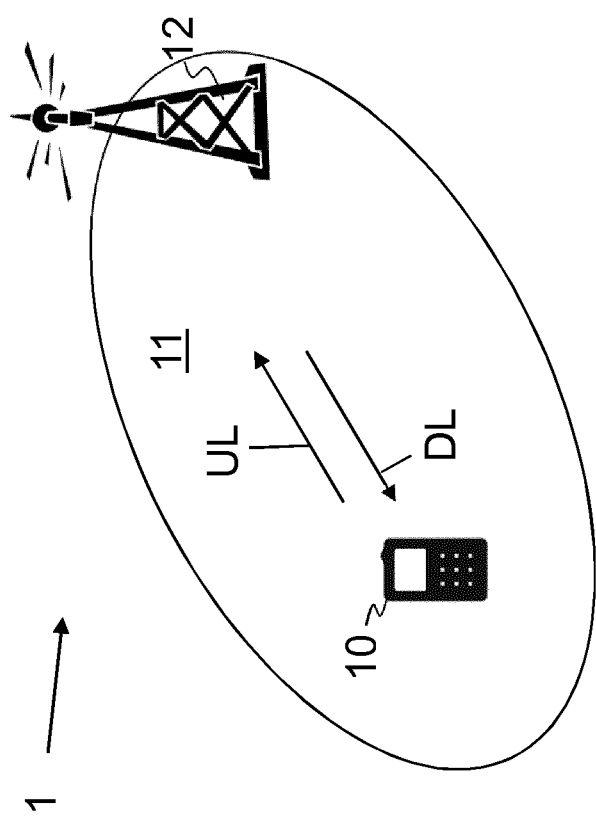
FIG. 3 shows a schematic overview depicting a wireless communication network with radio arrangements according to embodiments herein.

Embodiments herein relate to wireless communication networks in general. FIG. 3 is a schematic overview depicting a wireless communication network 1. The wireless communication network 1 comprises one or more RANs and one or more CNs. The wireless communication network 1 may use a number of different technologies, such as Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. The wireless communication network 1 is exemplified herein as an LTE network.

In the wireless communication network 1, a wireless device 10, also known as a mobile station, a user equipment and/or a wireless terminal, communicates via a Radio Access Network (RAN) to one or more core networks (CN). It should be understood by the skilled in the art that "wireless device" is a non-limiting term which means any wireless terminal, user equipment, Machine Type Communication (MTC) device, a Device to Device (D2D) terminal, or a node, e.g. a smart phone, a laptop, a mobile phone, a sensor, a relay, a mobile tablet or even a small base station communicating within respective cell.

The wireless communication network 1 covers a geographical area which is divided into cell areas, e.g. a cell 11 being served by a radio base station 12. The radio base station 12 may also be referred to as a first radio base station and e.g. a NodeB, an evolved Node B (eNB, eNode B), a base transceiver station, Access Point Base Station, base station router, or any other network unit capable of communicating with a user equipment within the cell served by the radio base station depending e.g. on the radio access technology and terminology used. The radio base station 12 may serve one or more cells, such as the cell 11. The radio base station 12 communicates over the air or radio interface operating on radio frequencies with the wireless device 10 within range of the radio base station 12. The wireless device 10 transmits data over the radio interface to the radio base station 12 in Uplink (UL) transmissions and the radio base station 12 transmits data over an air or radio interface to the user equipment 10 in Downlink (DL) transmissions.

The wireless device 10 and the radio base station 12 are both examples of radio apparatuses. As stated in the background radio apparatuses may use dedicated transmission and reception antennas for the TX and RX signals or one common antenna to transmit and receive signals. According to embodiments herein a radio arrangement is provided comprising a radio apparatus, e.g. the wireless device 10 and/or the radio base station 12, and an antenna arrangement, e.g. an adapter board and/or antenna module e.g. comprising internal/external antenna or antennas. The antenna arrangement, which is attached to the radio apparatus, informs, by some means, a configuration of the antenna arrangement to the radio apparatus. The radio apparatus then modifies/selects a signal path configuration to support the antenna arrangement. The signal path configuration may be selected based on number of antennas, antenna type, antenna connections/connectors of the antenna arrangement. The signal path configuration may alternatively or additionally be selected based on an expected isolation level between transmission and reception antennas. The antenna arrangement may indicate the configuration of the antenna arrangement e.g. antenna type, with a dedicated connection interface or transmitting signal or signals. Embodiments herein provide e.g. a radio arrangement for dedicated transmission and reception antennas which may support an external antenna with one antenna connection, also called a common antenna. This may improve flexibility of the wireless communication network 1 as an operator may modify the antenna configuration to change radiation pattern or change/enhance coverage of the wireless communication network 1.

Figure 4A:
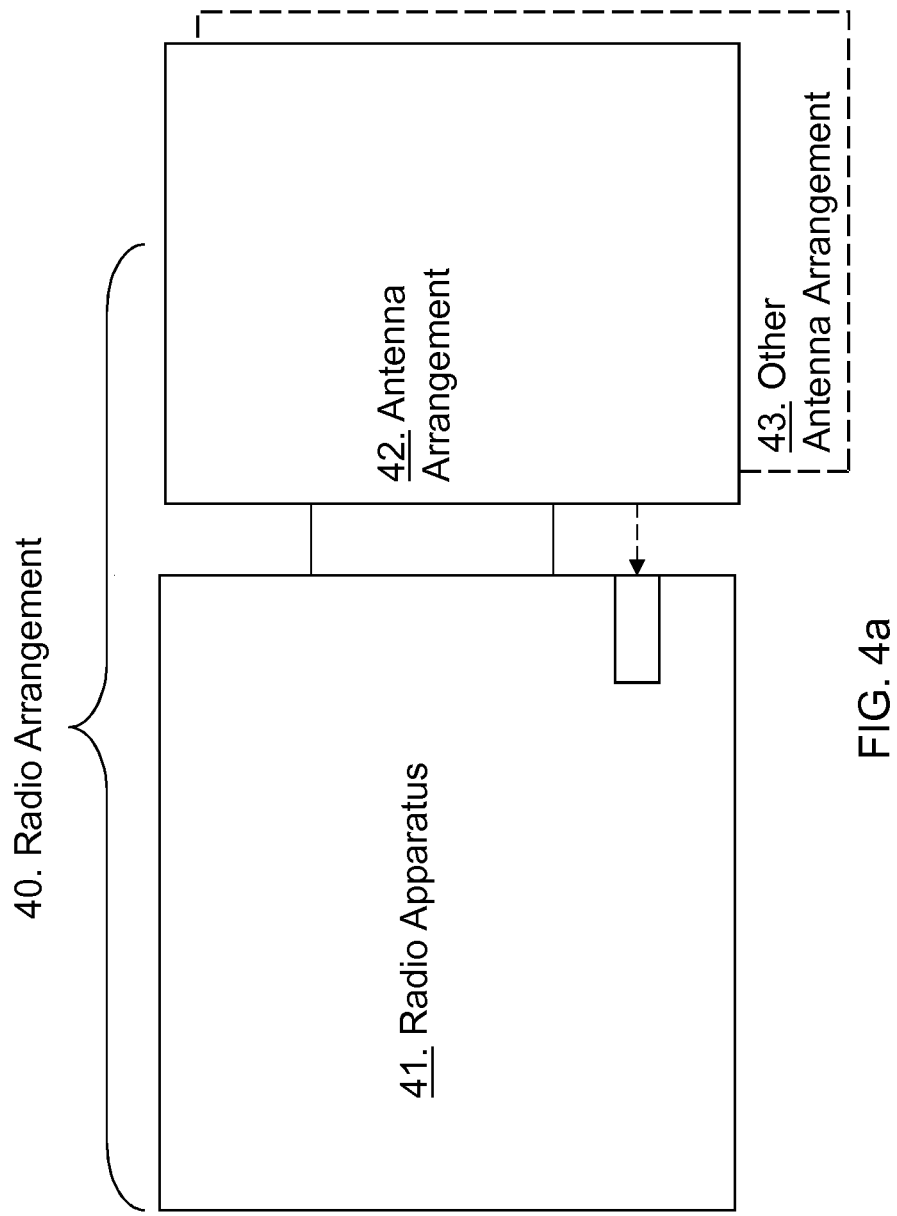
FIGS. 4a-4b show block diagrams depicting radio arrangements with a radio apparatus and an antenna arrangement according to embodiments herein.

FIG. 4*a* shows a block diagram depicting a radio arrangement 40 according to some embodiments herein. The radio arrangement 40 comprises a radio apparatus 41 and an antenna arrangement 42. According to some embodiments herein the antenna arrangement 42 transmits or informs the radio apparatus 41 about the configuration of the antenna arrangement 42. This is indicated by the dashed arrow in the FIG. 4*a*. The radio apparatus 41 may have a radio card with dedicated RX and TX radio output ports for two MIMO branches, total 4 ports, and those will be used for antenna connections. These antenna connections support both integrated internal dedicated RX and TX antennas as well as a combined external antenna connector from the antenna arrangement 42. According to some embodiments herein, the radio apparatus 41 may combine two signal paths into one common antenna port automatically based on an indication of the configuration provided by the antenna arrangement 42. The indication may be routed with additional signal lines along the signal paths. The indication may be e.g. a no connection, such as a floating, indication, a known resistance, a ground connection or operational voltage depending on antenna type. The indication of configuration may indicate type of antenna, wherein each antenna type may be assigned at least one of the indications. E.g. the indication may be a signal floating or grounded pin, and this may be done without any active component at the antenna arrangement 42. This would reduce number of needed type approval measurements for each supported antenna configuration. The indication may be used by the radio apparatus 41 for controlling signal path configuration in the radio apparatus 41 and/or in the antenna arrangement 42.

Thus, FIG. 4*a* shows the radio arrangement 40 for enabling communication in the wireless communication network 1. The radio arrangement 40 comprises at least two signal paths for transmitting and/or receiving signals to and/or from a radio device, such as the wireless device 10 or the radio base station 12, in the wireless communication network 1. The radio arrangement 40 comprises the radio apparatus 41 and the antenna arrangement 42 connected to the radio apparatus 41.

The radio arrangement 40 is configured to obtain, at the radio apparatus 41, an indication, which indication is indicating a configuration of the antenna arrangement 42 connected to the radio apparatus 41. Furthermore, the radio arrangement 40 is configured to select, for communication in the wireless communication network 1, a signal path configuration at the radio apparatus 41 and/or the antenna arrangement 42 of the at least two signal paths based on the obtained indication. The signal path configuration may be altered either in the radio apparatus 41 and/or in the antenna arrangement 42 based on one or more radio parameters, which may be at least one of the following: supported frequency configuration, operational frequency of the transmission and/or reception, signal strength of transmission and/or reception, signal characteristics of transmission and/or reception. The antenna arrangement 42 may be configured to signal the indication to the radio apparatus 41. The radio arrangement 40 may be configured to select signal path configuration at the antenna arrangement 42 by transmitting a control signal to the antenna arrangement 42 from the radio apparatus 41. The radio arrangement 40 may be configured to select signal path configuration at the antenna arrangement 42 by transmitting a control signal to the antenna arrangement 42 from the radio apparatus 41.

Another antenna arrangement 43 may be connected to the radio apparatus 41, and the radio arrangement 40 may then be configured to select signal path configuration where transmissions are convoyed to the antenna arrangement 42 connected to the radio apparatus 41 and receptions are convoyed to the other antenna arrangement 43 connected to the radio apparatus 41 or vice versa.

Antenna radiation pattern may be optimized based on orientation of the installation or configuration of the radio arrangement 40. Embodiments herein enable usage of dedicated internal RX and TX antennas and combined external antenna with the same antenna connection ports. The antenna arrangement 42 may indicate own type with a signal also referred to as an information signal and radio apparatus 41 may adapt signal paths configuration to match the antenna configuration. The antenna arrangement 42 may be changed at a site in operation and the radio apparatus 41 may maintain an optimal performance with any supported, attached antenna arrangement. Some embodiments enable active filtering based on information of antenna arrangement 42 to improve radio performance of the radio arrangement 40.

Figure 4B:
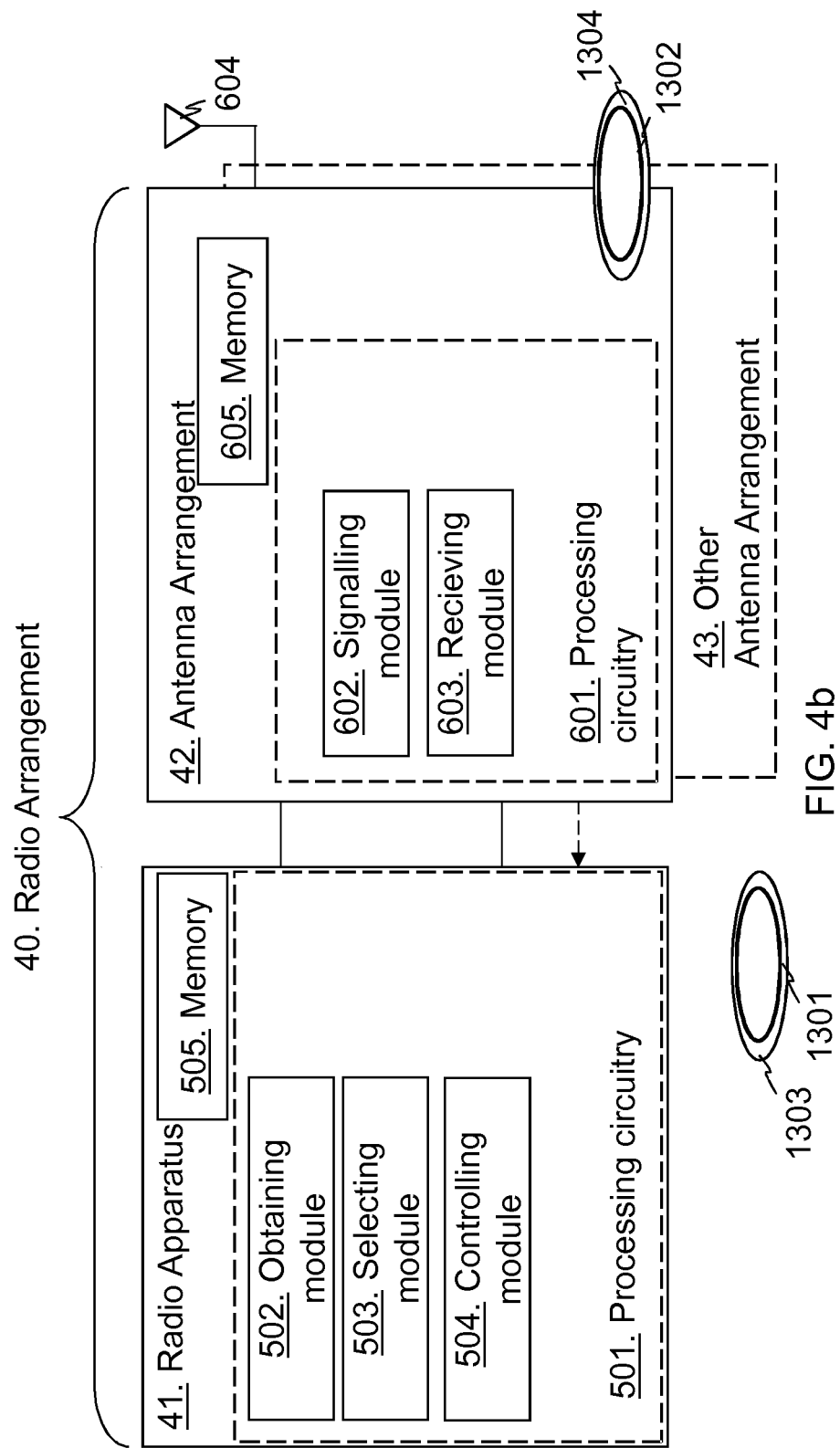

FIG. 4b is a block diagram depicting the radio apparatus 41 and the antenna arrangement 42. FIG. 4b shows the radio apparatus 41 according to embodiments herein for enabling communication in the wireless communication network 1. The radio apparatus 41 is configured to obtain an indication, which indication is indicating configuration of antenna arrangement 42 connected to the radio apparatus 41. Furthermore, the radio apparatus 41 is configured to select, for communication in the wireless communication network 1, a signal path configuration, at the radio apparatus 41 and/or the antenna arrangement 42, of at least two signal path configurations for transmitting and/or receiving signals to and/or from a radio device in the wireless communication network, based on the obtained indication. The indication may be at least one of a non connection, a known resistor value, a known voltage, a ground connection, and/or a dedicated identification circuitry from the antenna arrangement 42 connected to the radio apparatus 41. The radio apparatus 41 may be configured to select signal path configuration by controlling signal path in the antenna arrangement 42. The radio apparatus 41 may further be configured to control signal path configuration in the antenna arrangement 42 by transmitting a control signal to the antenna arrangement 42. The radio apparatus 41 may be configured to obtain the indication by receiving a signal from the antenna arrangement 42. The signal may indicate antenna polarization, antenna gain, signal paths dedicated to receiving and transmitting or a signal path combining the receiving and transmitting, orientation of the antenna arrangement 42, and/or the like. The radio apparatus 41 may be configured to select a signal path configuration for transmissions and a different signal path configuration for receptions. The radio apparatus 41 may be configured to be connected to another antenna arrangement 43, and the radio apparatus 41 may then be configured to select signal path configuration where transmissions are convoyed to the antenna arrangement 42 connected to the radio apparatus 41 and receptions are convoyed to the other antenna arrangement 43 connected to the radio apparatus 41 or vice versa. The antenna arrangement 42 may comprise an external antenna and the other antenna arrangement 43 may comprise one or more internal antennas. The signal path configuration may be altered in the radio apparatus 41 based on one or more radio parameters, which is at least one of the following: supported frequency configuration, operational frequency of the transmission and/or reception, signal strength of transmission and/or reception, signal characteristics of transmission and/or reception.

According to some embodiments herein the radio apparatus 41 may comprise processing circuitry 501. The radio apparatus 41 may additionally or alternatively comprise an obtaining module 502. The processing circuitry 501, and/or the obtaining module 502 may be configured to obtain an indication, which indication is indicating configuration of the antenna arrangement 42 connected to the radio apparatus 41. The indication may be at least one of: a non connection; a known resistor value; a known voltage; a ground connection; and a dedicated identification circuitry from the antenna arrangement 42 connected to the radio apparatus 41. The processing circuitry 501, and/or the obtaining module 502 may be configured to obtain the indication by receiving a signal from the antenna arrangement 42. The signal may indicate antenna polarization, antenna gain, signal paths dedicated to receiving and transmitting or a signal path combining the receiving and transmitting, and/or orientation of the antenna arrangement 42 or similar parameters. The orientation may be detected from a sensor or a resistor and signaled to the radio apparatus 41. The radio apparatus 41 may comprise at least two signal path configurations for transmitting and/or receiving signals to and/or from a radio device in the wireless communication network 1. Antenna gain or antenna directivity may be used when selecting signal path configurations where effective radiated power, which is combination of antenna directivity and conducted transmission power, is limited.

The radio apparatus 41 may comprise a selecting module 503. The processing circuitry 501, and/or the selecting module 503 may be configured to select, for communication in the wireless communication network 1, a signal path configuration, at the radio apparatus 41 and/or the antenna arrangement 42, of at least two signal path configurations for transmitting and/or receiving signals to and/or from a radio device, e.g. the radio base station 12 or the wireless device 10, in the wireless communication network 1 based on the obtained indication. The processing circuitry 501, and/or the selecting module 503 may further be configured to select signal path configuration by controlling signal path in the antenna arrangement 42. In some embodiments the radio apparatus 41 may have another antenna arrangement 43 connected to it, then the processing circuitry 501, and/or the selecting module 503 may be configured to select signal path configuration where transmissions are convoyed to the antenna arrangement 42 connected to the radio apparatus 41 and receptions are convoyed to the other antenna arrangement 43 connected to the radio apparatus 41 or vice versa. The antenna arrangement 42 may comprise an external antenna and the other antenna arrangement 43 may comprise one or more internal antennas. The signal path configuration may be altered in the radio apparatus 41 based on one or more radio parameters, which radio parameters may be at least one of the following: supported frequency configuration; operational frequency of the transmission and/or reception; signal strength of transmission and/or reception; and signal characteristics of transmission and/or reception.

The radio apparatus 41 may comprise a controlling module 504. The processing circuitry 501, and/or the controlling module 504 may be configured to control signal path configuration in the antenna arrangement 42 by transmitting a control signal to the antenna arrangement 42. The processing circuitry 501, and/or the selecting module 503 may be configured to select a signal path configuration for transmissions and a different signal path configuration for receptions.

The radio apparatus 41 further comprises a memory 505. The memory 505 may comprise one or more units for storing data on, such as control signals, frequencies, signal strengths, signal characteristics, antenna polarization, antenna gain, orientation, signal path configurations, applications to perform actions herein and similar.

FIG. 4b is a block diagram further depicting an antenna arrangement 42 for enabling communication in the wireless communication network. The antenna arrangement 42 is configured to connect to the radio apparatus 41 to form a radio arrangement 40 comprising at least two signal path configurations for transmitting and/or receiving signals to and/or from a radio device in the wireless communication network 1, i.e. the radio arrangement 40 comprises at least two signal paths for transmitting and/or receiving signals to and/or from a radio device in the wireless communication network 1. The antenna arrangement 42 is configured to signal an indication to the radio apparatus 41, which indication is indicating a configuration of the antenna arrangement 42 and is enabling communication in the wireless communication network 1. The signal may indicate antenna polarization, antenna gain, signal paths dedicated to receiving and transmitting or a signal path combining the receiving and transmitting, and/or orientation of the antenna arrangement 42. The orientation may be detected by a sensor, such as an accelerometer, a gyro and/or the like. The antenna arrangement 42 may be configured to receive a control signal from the radio apparatus 41, which control signal selects signal path configuration in the antenna arrangement 42. The signal path configuration may be altered in the antenna arrangement 42 based on one or more radio parameters, which is at least one of the following: supported frequency configuration; operational frequency of the transmission and/or reception; signal strength of transmission and/or reception; and signal characteristics of transmission and/or reception. The antenna arrangement 42 may comprise an external antenna.

According to some embodiments the antenna arrangement 42 may comprise processing circuitry 601. The antenna arrangement 42 may additionally or alternatively further comprise a signaling module 602. The processing circuitry 601, and/or the signaling module 602 may be configured to signal an indication, which indication is indicating a configuration of the antenna arrangement 42 and is enabling communication in the wireless communication network 1. The signal may indicate antenna polarization, antenna gain, signal paths dedicated to receiving and transmitting or a signal path combining the receiving and transmitting, orientation of the antenna arrangement 42 and/or the like.

The antenna arrangement 42 may further comprise a receiving module 603. The processing circuitry 601, and/or the receiving module 603 may be configured to receive a control signal from the radio apparatus 41, which control signal selects signal path configuration in the antenna arrangement 42. The signal path configuration may be altered, or the antenna arrangement 42 may be configured to alter signal path configuration, in the antenna arrangement 42 based on one or more radio parameters. The radio parameters may be at least one of the following: supported frequency configuration; operational frequency of the transmission and/or reception; signal strength of transmission and/or reception; and signal characteristics of transmission and/or reception.

The antenna arrangement 42 may comprise an external antenna 604 or a plurality of antennas, e.g. a common antenna or dedicated antennas.

It may be advantageous to change a radiation pattern of the antenna arrangement 42 based on the installation orientation or installation position. The installation information of the product or radio arrangement may be informed to the radio apparatus 41 and may be used to select the signal path configuration.

The antenna arrangement 42 further comprises a memory 605. The memory 605 may comprise one or more units for storing data on, such as control signals, frequencies, signal strengths, signal characteristics, antenna polarization, antenna gain, orientation, signal path configurations, applications to perform actions herein and similar.

Figure 5:
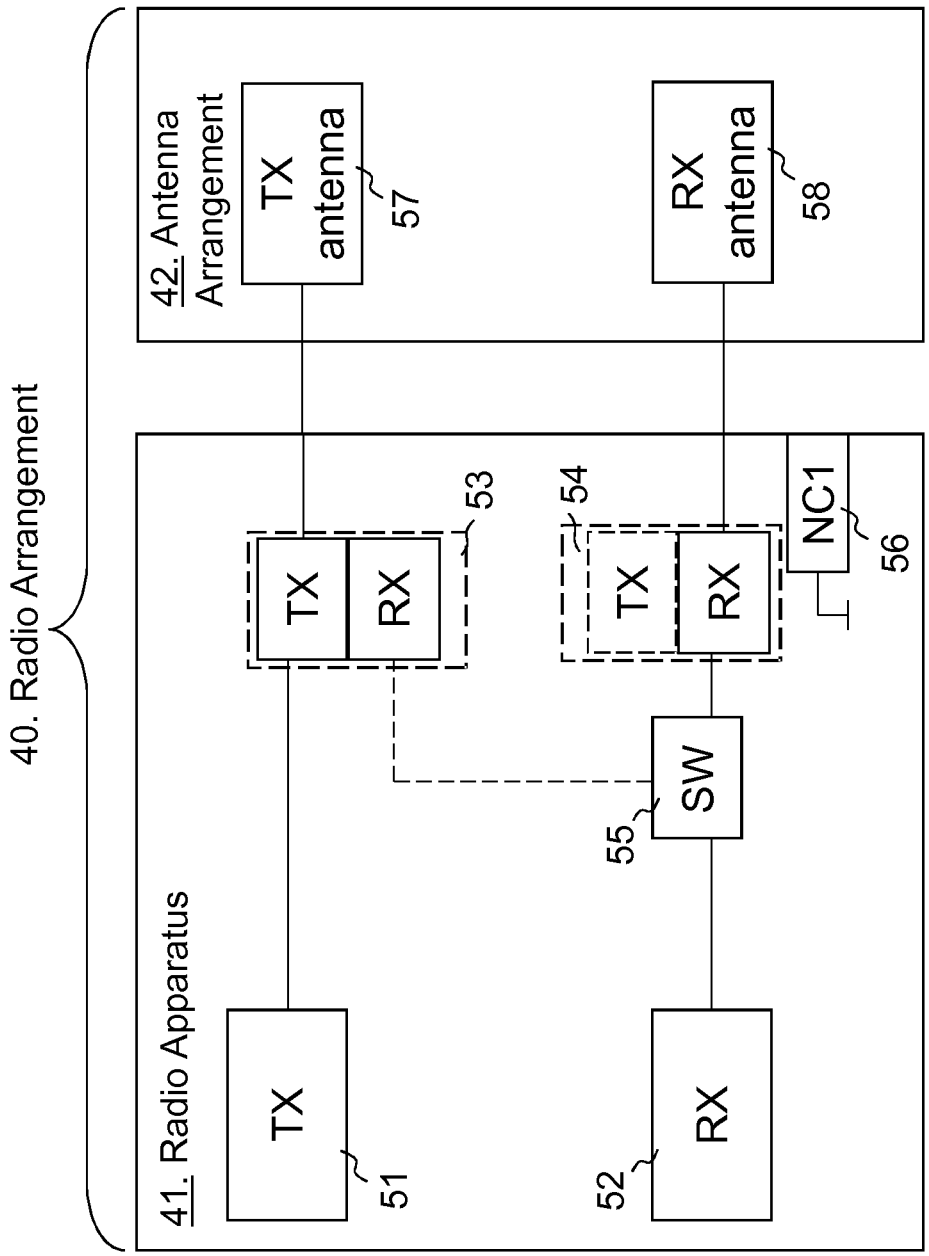
FIG. 5 shows a block diagram depicting a radio arrangement according to embodiments herein.

FIG. 5 shows a block diagram depicting an example of the radio arrangement 40 with the radio apparatus 41 and the antenna arrangement 42. The radio apparatus 41 may support plurality of different frequency bands but for simplicity only one signal path or signal path configuration is shown in the figures below. The radio apparatus 41 may comprise an internal antenna configuration with dedicated transmission/reception lines with a transmitter 51 and a receiver 52. The radio apparatus 41 may further comprise a first duplex filter 53 with a TX filter and a RX filter and a second duplex filter 54 comprising a TX filter and a RX filter. The radio apparatus may further comprise a switch 55, an example of the selecting module 503, selecting a signal path configuration at the radio apparatus 41, i.e. receiving signals either from the second duplex filer 54 or the first duplex filter 53. The radio apparatus 41 may comprise a notification connection 56, denoted NC1, configured to obtain the indication, hence being an example of the obtaining module 502. A notification connection may be an interface. The interface may be implemented as at least one of: Serial Peripheral Interface (SPI), Inter-Integrated Circuit (I²C), Mobile Industry Processor Interface RF Front-End Interface (MIPI RFFE), General Purpose Input Output (GPIO) or proprietary interface. The antenna arrangement 42 may comprise a dedicated transmission antenna 57 and a dedicated reception antenna 58. It should be understood that the dedicated antennas 57,58 may be external as well as internal antennas.

In the illustrated example the radio apparatus 41 obtains, an indication, which indication is indicating a configuration of the antenna arrangement 42 connected to the radio apparatus 41 in the NC1. E.g. the radio apparatus 41 receives a dedicated signal at the NC1, or NC1 connection is left floating or no connection is detected, indicating configuration of dedicated transmission and reception antennas of the antenna arrangement 42. The radio apparatus 41 controls the switch 55 and selects a signal path configuration at the radio apparatus 41 based on the obtained indication. The indication may control directly the switch 55 to convoy the radio signal from one radio signal path to another signal path. E.g. RX signal is connected to dedicated RX signal port and hence the switch 55 is in a dedicated mode i.e. connecting the second duplex filter 54 to the receiver 52. Hence, in this signal path configuration the transmission signal is convoyed to dedicated transmission antenna 57 and reception signal is convoyed from the dedicated reception antenna 58 to receiver 52. The radio apparatus 41 may use dedicated duplex filters 53,54 for both transmitter and receiver signal paths, since it improves filtering characteristics. The TX filter of the second duplex filter 54 is marked with a dashed line, since it may not be needed if the RX filter is connected to the dedicated RX antenna 58 only and thus the TX filter is not used.

Figure 6:
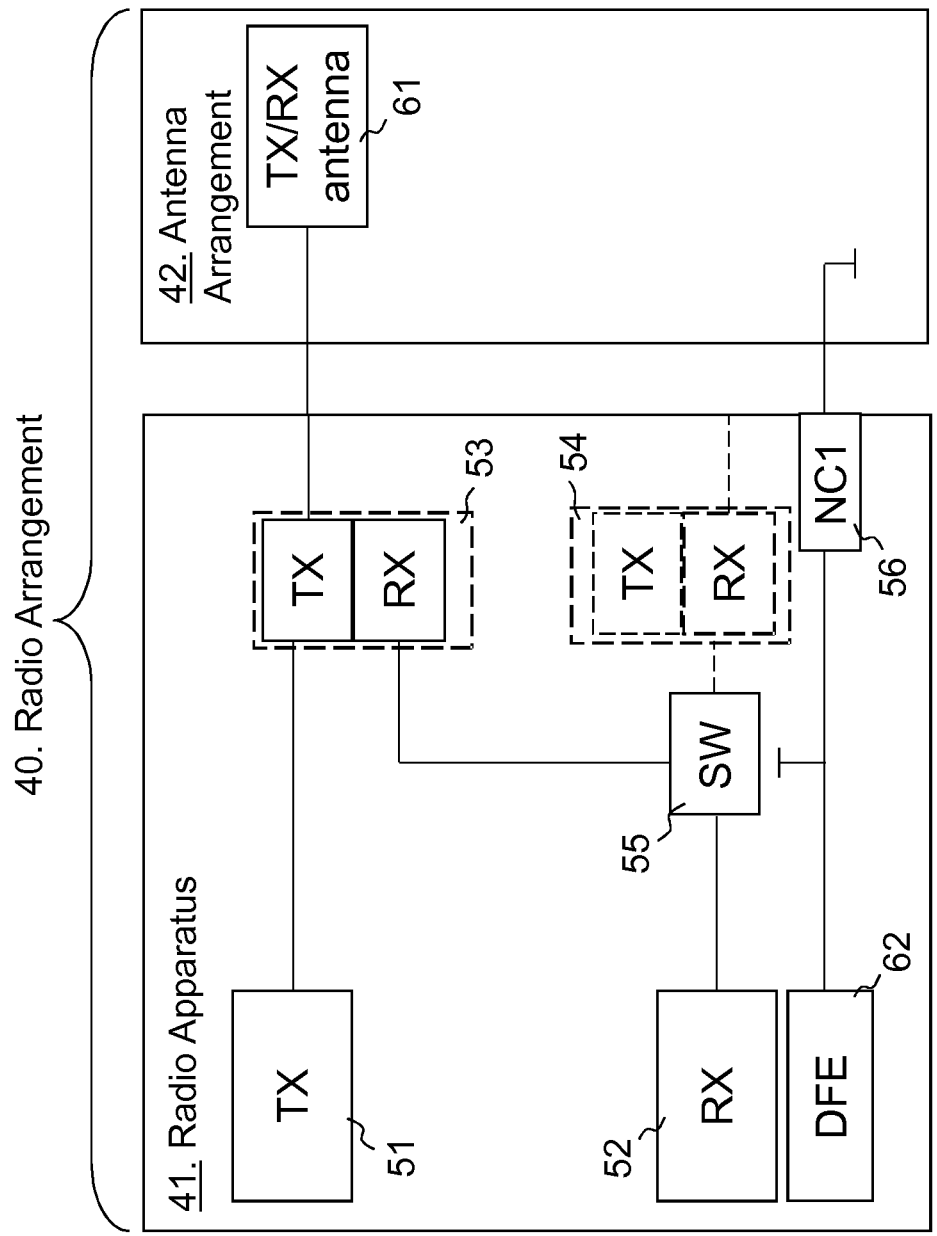
FIG. 6 shows a block diagram depicting a radio arrangement according to embodiments herein.

FIG. 6 shows a similar block diagram depicting an example of the radio arrangement 40 with the radio apparatus 41 and the antenna arrangement 42. However, in this example the antenna arrangement 42 comprises a common antenna 61. As stated above the radio apparatus 41 may comprise dedicated transmission/reception lines with the transmitter 51 and the receiver 52. The radio apparatus 41 may further comprise the first duplex filter 53 with a TX filter and a RX filter and the second duplex filter 54 comprising a TX filter and a RX filter. The radio apparatus 41 may further comprise the switch 55 selecting a signal path configuration at the radio apparatus 41, i.e. receiving signals either from the second duplex filer 54 or the first duplex filter 53. The radio apparatus 41 may comprise the NC1 configured to obtain the indication.

The radio apparatus 41 may support an external antenna with one single cable. This may be done with the antenna arrangement 42 replacing an integrated antenna module to the radio apparatus 41. The cable from external antenna may be connected to a Quick disconnect subminiature version A (QMA)—connector of the antenna arrangement 42. The antenna arrangement 42 may indicate external antenna attachment with NC1 e.g. by ground signal. In the illustrated example the radio apparatus 41 obtains, an indication, which indication is indicating a common antenna configuration of the antenna arrangement 42. The radio apparatus 41 controls the switch 55 and selects a signal path configuration at the radio apparatus 41 based on the obtained indication, e.g. the indication may control directly the switch 55 to convoy the radio signal from one radio signal path to another signal path. E.g. RX signal is connected to a common RX signal port and hence the switch 55 is in a common mode i.e. connecting the first duplex filter 54 to the receiver 52. Hence, the second duplex filter is marked with dashed lines. Additionally the same indication may be routed to a Digital Frond-End (DFE) 62 which may control other radio parameters to comply to signal path change. Thus, the NC1 signal may control the switch 55 to connect reception signal from TX port to the receiver 52. A TX signal port is used only for transmission with internal antennas but with the external antenna case both receiver 52 and transmitter 51 are connected to the TX signal port.

Figure 7:
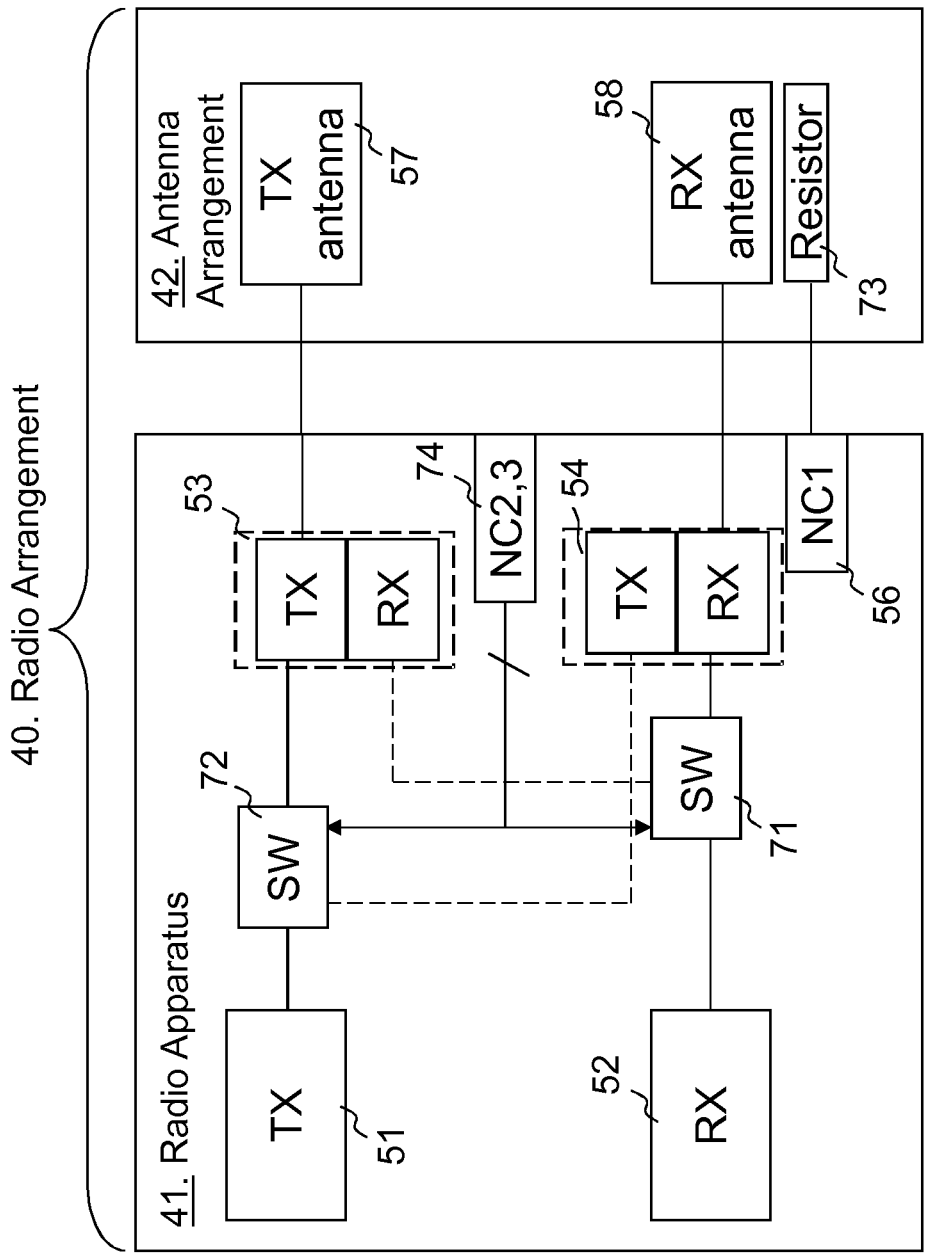
FIG. 7 shows a block diagram depicting a radio arrangement according to embodiments herein.

FIG. 7 shows a similar block diagram depicting an example of the radio arrangement 40 with the radio apparatus 41 and the antenna arrangement 42. In this example the antenna arrangement 42 comprises the dedicated transmission antenna 57 and the dedicated reception antenna 58. In this example the radio apparatus 41 comprises as in FIG. 5 an internal antenna configuration with dedicated transmission/reception lines with the transmitter 51 and the receiver 52. The radio apparatus 41 may further comprise the first duplex filter 53 and the second duplex filter 54 comprising a TX filter and a RX filter, respectively. The exemplified radio apparatus 41 further comprises a receiver switch 71, being an example of the switch 55 in FIG. 5 and the selecting module 503 in FIG. 4b, for selecting a receiving signal path configuration at the radio apparatus 41, i.e. receiving signals either from the second duplex filer 54 or the first duplex filter 53. The radio apparatus 42 furthermore comprises a transmitter switch 72 for selecting a transmitting signal path configuration at the radio apparatus 41, i.e. transmitting signals either via the first duplex filter 53 or via the second duplex filer 54. The transmitter switch 72 also being an example of the switch 55 in FIG. 5 and the selecting module 503 in FIG. 4b.

The receiver switch 71 and the transmitter switch 72 may be controlled by indications received over the NC1 but also over different connections such as a second NC or a third NC denoted NC2,3. Thus, the connected antenna arrangement 42 may signal the indication, when connected to the radio apparatus 41, that it has a dedicated antennas configuration over NC1 and/or NC2,3 being examples of obtaining modules 502. The indication may be a resistor value from a resistor 73, being an example of the signaling module 602 in FIG. 4b, at the antenna arrangement 42 to the NC1 and when NC2,3 is not connected. The resistor 73 or a sensor may also be used to detect orientation of the antenna arrangement 42. When the radio apparatus has received the indication of dedicated antennas configuration, the radio apparatus 41 may select or switch the signal path configurations using the receiver switch 71 and the transmitter switch 72 so that transmissions are sent over the first duplex filter 53 and receive signals are received from the second duplex filter 54. The signals or indications over the NC1-3 may active/deactivate the switches. However, the dashed lines paths indicate the signal paths that may be used when the antenna arrangement 42 has a common antenna either connected over the first duplex filter 53 or the second duplex filter 54.

Alternatively the antenna arrangement 42 may include additional switches and additional duplex filters to improve signal isolation when being configured with a common antenna or a combined antenna port. This is shown in FIG. 8 and more specifically shown in FIG. 9.

Figure 8:
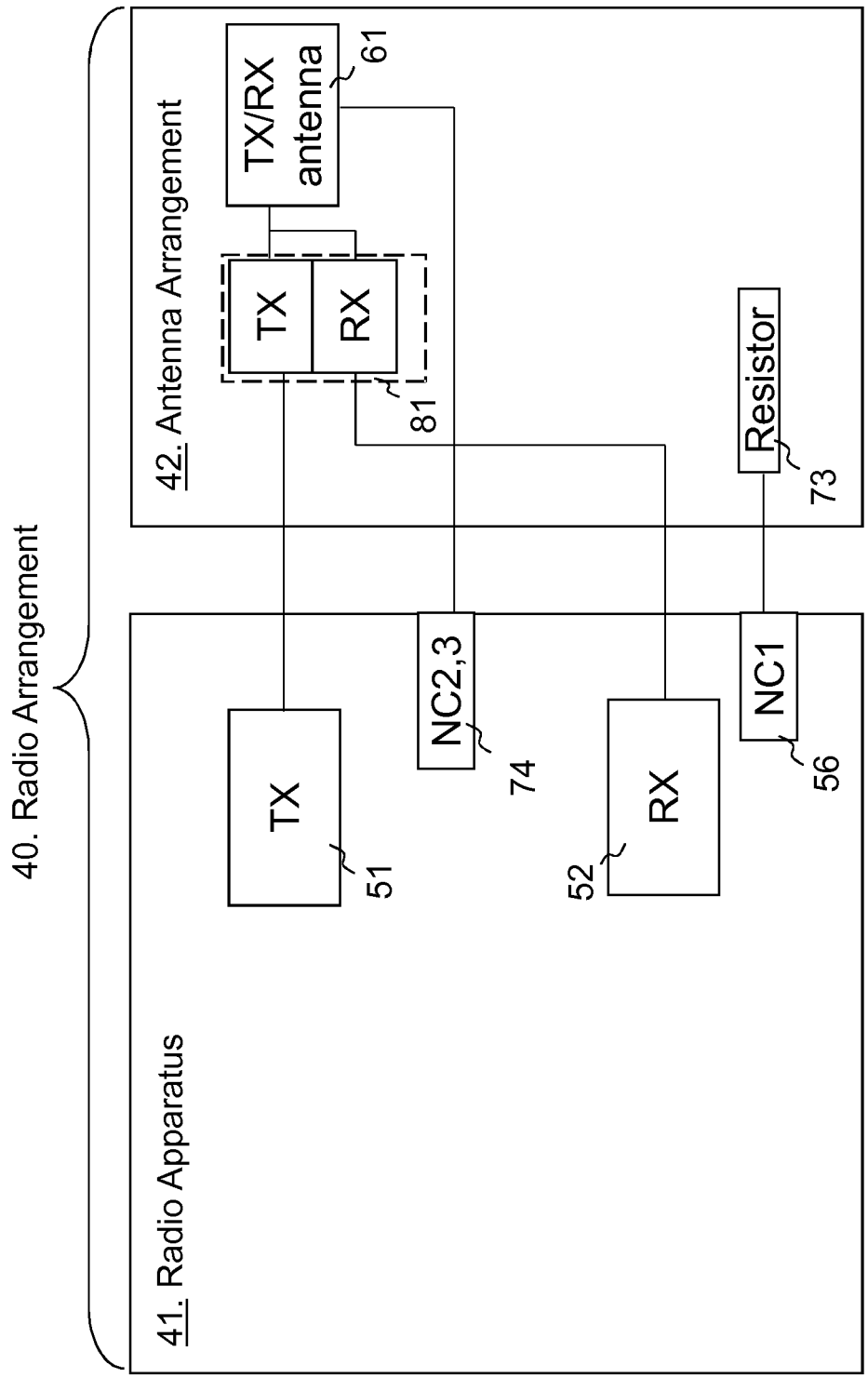
FIG. 8 shows a block diagram depicting a radio arrangement according to embodiments herein.

FIG. 8 is a block diagram depicting the radio arrangement 40 but where the radio apparatus 41 select signal path configuration at the antenna arrangement 42. In this example the radio apparatus 41 comprises dedicated transmission/reception lines with the transmitter 51 and the receiver 52 and the antenna arrangement 42 comprises the common antenna 61 or an external combined transmission and reception antenna, not shown. The antenna arrangement 42 may indicate the configuration or antenna type by signaling an NC1 signal e.g. with a resistor value from the resistor 73 to the radio apparatus 41. In this implementation both transmission and reception antenna ports are connected to the antenna arrangement 42 and the TX and RX signal combination is done at the antenna arrangement side. The different signals are filtered in a third duplex filter 81 at the antenna arrangement 42. The antenna arrangement 42 may use similar duplex filters as used in the radio apparatus 41 above. The radio apparatus 41 may select signal path at the antenna arrangement 42 by signalling control information via NC2 and NC3 signal lines, e.g. controlling a switch or switches in the antenna arrangement 42 and thus being examples of the controlling module 504 in FIG. 4b. The control signal NC2 and NC3 may tune resonance frequency of antenna 61. The tuning of the antenna 61 may be done with at least one of: PIN diode, ground connection selection of antenna 61, controlling antenna impedance tuner component, and change impedance of antenna signal line of antenna 61.

Figure 9:
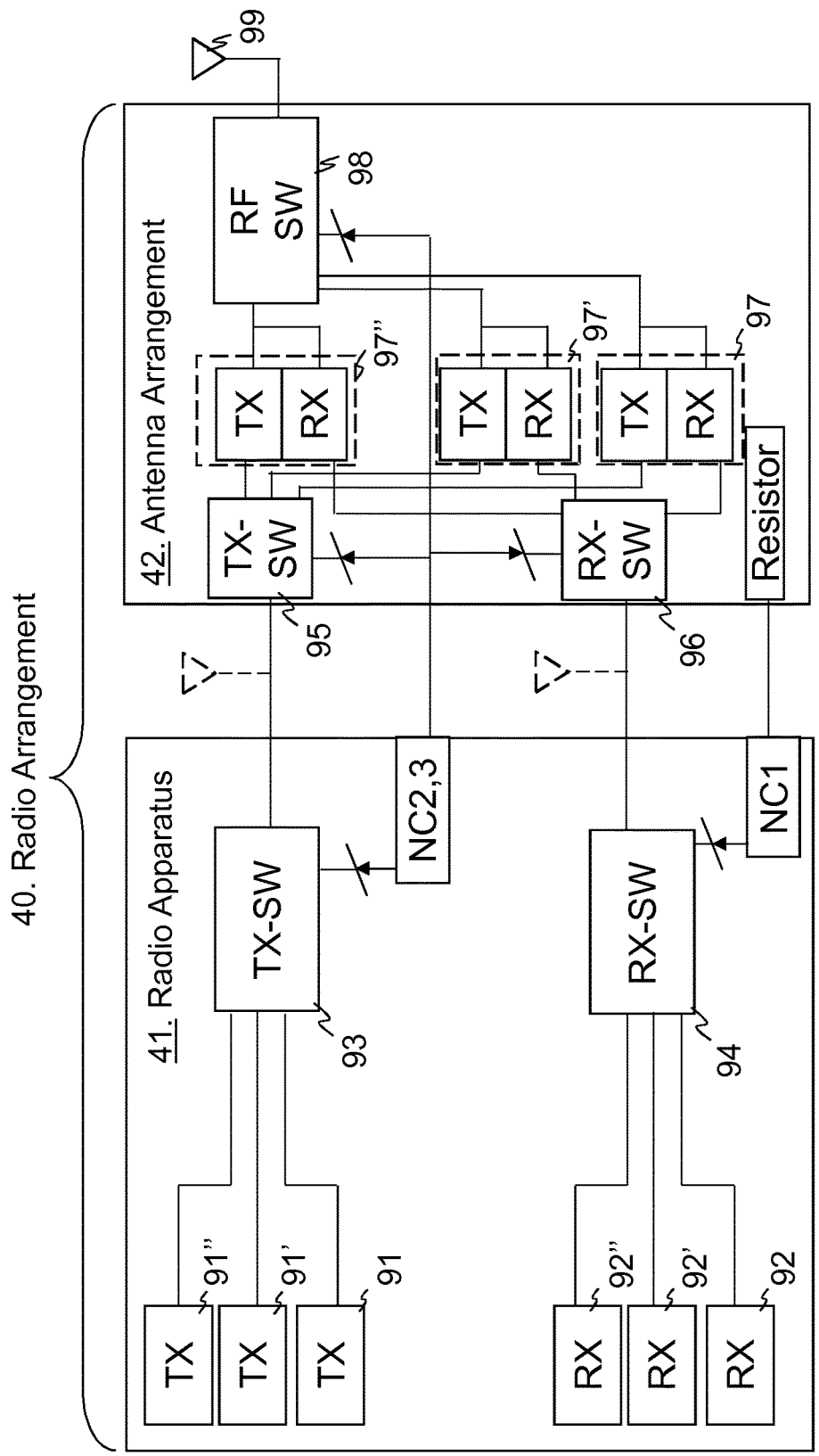
FIG. 9 shows a block diagram depicting a radio arrangement according to embodiments herein.

FIG. 9 is a block diagram depicting an example of the radio arrangement 40 comprising the radio apparatus 41 and the antenna arrangement 42, wherein the radio apparatus 41 controls signal path configuration in the antenna arrangement 42. In this example, the radio apparatus 41 comprises a transmitter per frequency band, e.g. three transmitters 91,91',91", and a receiver per frequency band, e.g. three receivers 92,92',92". The radio apparatus 41 further comprises a first TX switch 93 and a first RX switch 94. The antenna arrangement 42 comprises a second TX switch 95 and a second RX switch 96. Furthermore, the antenna arrangement 42 comprises a duplex filter per frequency band, e.g. three duplex filters 97,97',97", and a radio frequency (RF) switch 98 connected to an external antenna 99. All the switches being examples of the selecting module 503 in FIG. 4b.

The radio apparatus 41 receives an NC1 signal from the antenna arrangement 42 once attached to the radio apparatus 41, e.g. a resistor value from the resistor in the antenna arrangement 42 controlling the first RX switch 94. NC2 and NC3 may be used as control signals to the first TX switch 93, the second TX switch 95 and the second RX switch 96. Based on the control signals, following signal connections may be done, first transmitter and receiver 91,92 may be connected to the first duplex filter 97, second transmitter and receiver 91',92' may be connected to the second duplex filter 97', and third transmitter and receiver 91",92" may be connected to the third duplex filter 97". Furthermore, the NC2 and NC3 may be used to control the RF switch 98, and/or may tune resonance frequency of the external antenna 99. Thus, in this implementation both transmission and reception antenna ports are connected to the antenna arrangement 42 and the TX and RX signal combination is done at the antenna arrangement 42. The antenna arrangement 42 may re-use similar duplex filters as used in radio apparatus 41. The RF switch control from the radio apparatus 41 may happen via NC2 and NC3 signal lines.

As stated above, alternatively, different antennas may have different polarizations and antenna patterns. Since the radio apparatus 41 may be installed either to ceiling or to a wall then optimal antenna pattern is different depending on the orientation of the radio apparatus and/or antenna arrangement 42. For example it is beneficial to have a horizontal pattern for wall mounting and a vertical pattern for ceiling mounting. The antenna arrangement 42 may indicate the orientation or antenna polarization, antenna gain support via antenna interface signal to the radio apparatus 41. The radio apparatus 41 may detect orientation of the product e.g. with spirit level or gyroscope or stored by installation person. The radio apparatus 41 may select signal path configuration at the radio apparatus 41 and/or the antenna arrangement 42 of the at least two signal paths based on the obtained indication of orientation and/or antenna polarization/gain.

It may be advantageous to change a radiation pattern of the antenna arrangement 42 based on the installation orientation or installation position. The installation information of the product may be used to select the signal path configuration.

Figure 10:
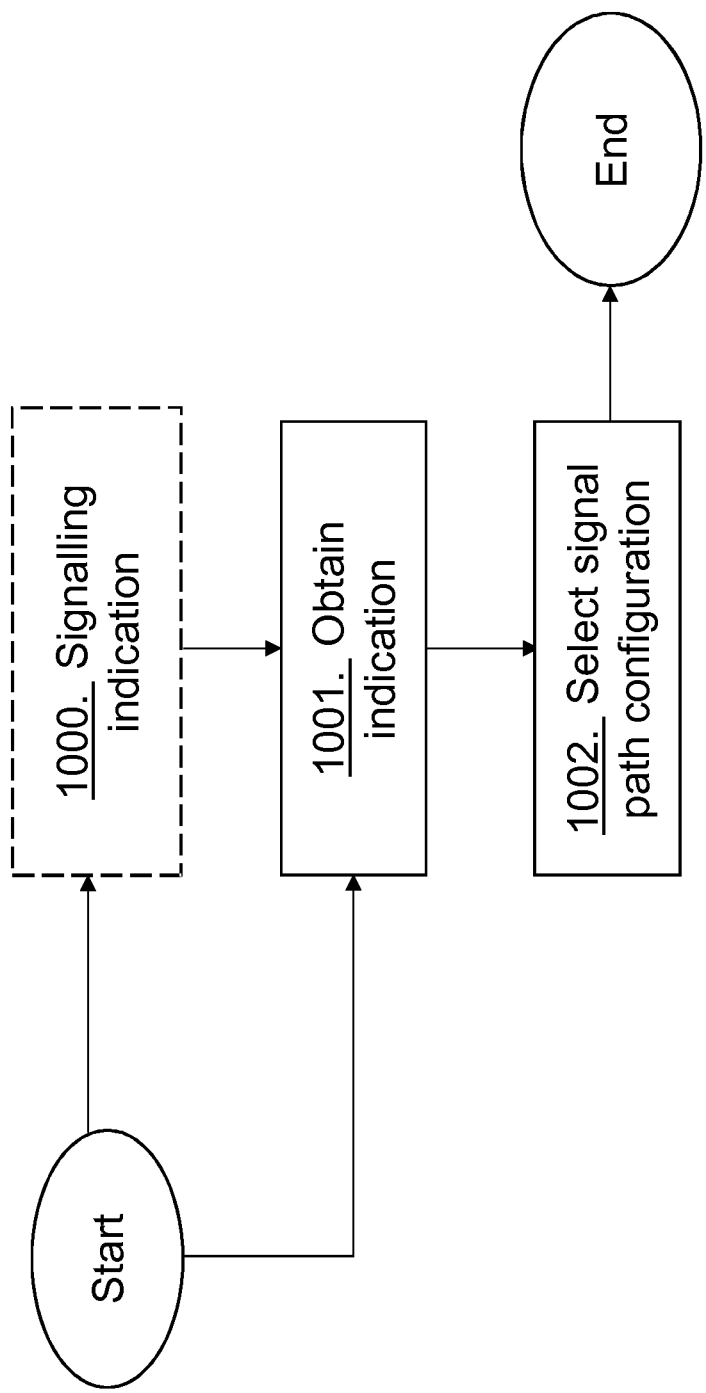
FIG. 10 shows a flowchart depicting a method performed in a radio arrangement according to embodiments herein.

The method actions performed in the radio arrangement 40 for enabling communication in a wireless communication network according to some embodiments will now be described with reference to a flowchart depicted in FIG. 10. The actions do not have to be taken in the order stated below, but may be taken in any suitable order. Actions performed in some embodiments are marked with dashed boxes. The radio arrangement 40 comprises at least two signal paths for transmitting and/or receiving signals to and/or from a radio device in the wireless communication network 1. The radio arrangement 40 comprises the radio apparatus 41, and the antenna arrangement 42 connected to the radio apparatus 41. In some examples, an antenna configuration may be modified when e.g. an orientation of the radio arrangement 40 is changed/altered, network coverage is changed, operational frequency of the radio arrangement 40 is changed. Thus, in order for the radio arrangement 40 to be able modify an antenna configuration from e.g. dedicated antennas to a common antenna the following method is provided.

Action 1000.

The radio arrangement 40 may signal from the antenna arrangement 42, the indication to the radio apparatus 41. The indication is indicating a configuration of the antenna arrangement 42 connected to the radio apparatus 41. The indication may be signaled over a Serial Peripheral Interface (SPI), Inter-Integrated Circuit (I²C), Mobile Industry Processor Interface RF Front-End Interface (MIPI RFFE), General Purpose Input Output (GPIO) or proprietary interface.

Action 1001.

The radio arrangement 40 obtains, at the radio apparatus 41, the indication. The indication is indicating a configuration of the antenna arrangement 42 connected to the radio apparatus 41.

Action 1002.

The radio arrangement 40 selects, for communication in the wireless communication network, a signal path configuration at the radio apparatus 41 and/or the antenna arrangement 42 of the at least two signal path configurations based on the obtained indication. The signal path configuration may be altered in the radio apparatus 41 and/or in the antenna arrangement 42 based on one or more radio parameters. The one or more radio parameters being at least one of the following: supported frequency configuration; operational frequency of the transmission and/or reception; signal strength of transmission and/or reception; signal characteristics of transmission and/or reception. The radio arrangement 40 may select signal path configuration at the antenna arrangement 42 by transmitting a control signal to the antenna arrangement 42 from the radio apparatus 41. The control signal may be transmitted over a Serial Peripheral Interface (SPI), Inter-Integrated Circuit (I²C), Mobile Industry Processor Interface RF Front-End Interface (MIPI RFFE), General Purpose Input Output (GPIO) or proprietary interface.

In some embodiments the radio arrangement 40 may comprise another antenna arrangement 43 connected to the radio apparatus 41, then the radio arrangement 40 may select the signal path configuration where transmissions are conveyed to the antenna arrangement 42 connected to the radio apparatus 41 and receptions are conveyed to the other antenna arrangement 43 connected to the radio apparatus 41 or vice versa.

Figure 11:
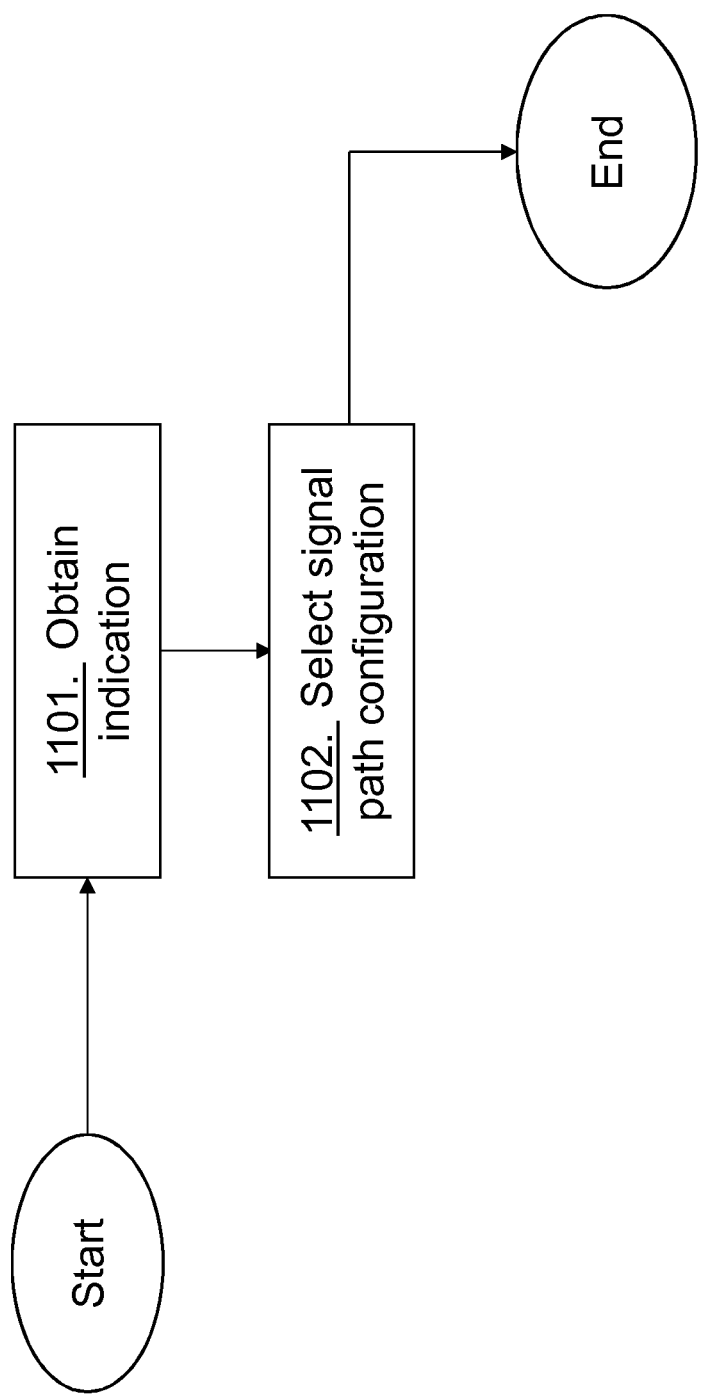
FIG. 11 shows a flowchart depicting a method performed in a radio apparatus according to embodiments herein.

The method actions performed in the radio apparatus 41 for enabling communication in the wireless communication network 1 according to some embodiments will now be described with reference to a flowchart depicted in FIG. 11. The actions do not have to be taken in the order stated below, but may be taken in any suitable order. Actions performed in some embodiments are marked with dashed boxes.

Action 1101.

The radio apparatus 41 obtains the indication, which indication is indicating a configuration of the antenna arrangement 42 connected to the radio apparatus 41. The radio apparatus 41 may obtain the indication by receiving a signal from the antenna arrangement 42. The signal may indicate antenna polarization, antenna gain, signal paths dedicated to receiving and transmitting or a signal path combining the receiving and transmitting, and/or orientation of the antenna arrangement 42.

Action 1102.

The radio apparatus 41 selects, for communication in the wireless communication network, a signal path configuration, at the radio apparatus 41 and/or the antenna arrangement 42, of at least two signal path configurations for transmitting and/or receiving signals to and/or from a radio device in the wireless communication network 1, based on the obtained indication. The indication may be at least one of: a non connection; a known resistor value; a known voltage; a ground connection; and/or a dedicated identification circuitry from the antenna arrangement 42 connected to the radio apparatus 41. The radio apparatus 41 may select signal path configuration by controlling signal path in the antenna arrangement 42. The radio apparatus 41 may control the signal path configuration in the antenna arrangement 42 by transmitting a control signal to the antenna arrangement 42. The radio apparatus 41 may select a signal path configuration for transmissions and a different signal path configuration for receptions. Another antenna arrangement 43 may be connected to the radio apparatus 41, and the radio apparatus 41 may then select a signal path configuration where transmissions are conveyed to the antenna arrangement 42 connected to the radio apparatus 41 and receptions are conveyed to the other antenna arrangement 43 connected to the radio apparatus 41 or vice versa. The antenna arrangement 41 may comprise an external antenna and the other antenna arrangement 43 may comprise one or more internal antennas. The radio apparatus 41 may select signal path configuration by altering signal path configuration based on one or more radio parameters, which is at least one of the following: supported frequency configuration; operational frequency of the transmission and/or reception; signal strength of transmission and/or reception; and signal characteristics of transmission and/or reception.

Figure 12:
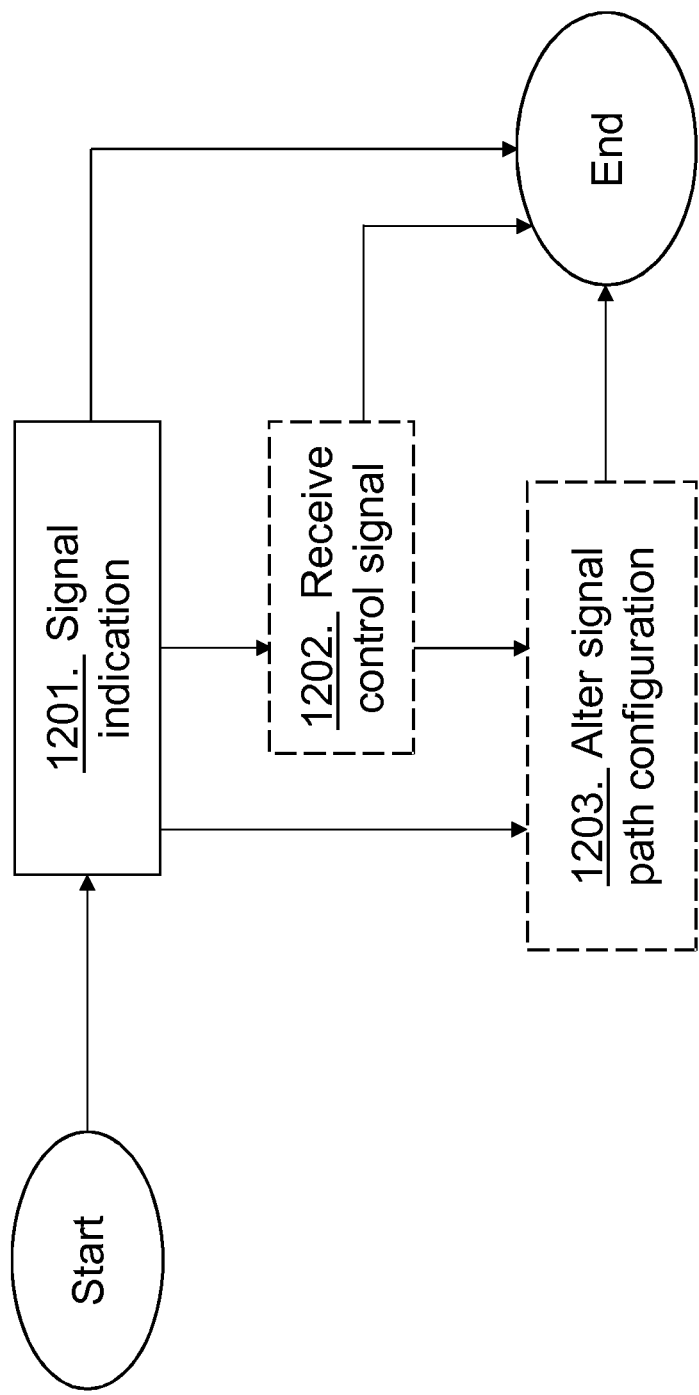
FIG. 12 shows a flowchart depicting a method performed in an antenna arrangement according to embodiments herein.

The method actions performed in the antenna arrangement 42 for enabling communication in the wireless communication network 1 according to some embodiments will now be described with reference to a flowchart depicted in FIG. 12. The actions do not have to be taken in the order stated below, but may be taken in any suitable order. Actions performed in some embodiments are marked with dashed boxes. The antenna arrangement 42 is configured to connect to the radio apparatus 41 to form the radio arrangement 40 comprising at least two signal path configurations for transmitting and/or receiving signals to and/or from a radio device in the wireless communication network 1. The antenna arrangement 42 may comprise an external antenna.

Action 1201.

The antenna arrangement 42 signals an indication to the radio apparatus 41, which indication is indicating a configuration of the antenna arrangement 42 and is enabling communication in the wireless communication network. The signal may indicate antenna polarization, antenna gain, signal paths dedicated to receiving and transmitting or a signal path combining the receiving and transmitting, and/or orientation of the antenna arrangement 42.

Action 1202.

The antenna arrangement 42 may receive a control signal from the radio apparatus 41, which control signal selects signal path configuration in the antenna arrangement 42.

Action 1203.

The antenna arrangement 42 may alter signal path configuration in the antenna arrangement 42 based on one or more radio parameters, which is at least one of the following: supported frequency configuration; operational frequency of the transmission and/or reception; signal strength of transmission and/or reception; signal characteristics of transmission and/or reception.

The methods according to the embodiments described herein for the radio arrangement, radio apparatus, and antenna arrangement are respectively implemented by means of e.g. a first computer program 1301 or a second computer program 1302 shown in FIG. 4*b* also referred to as a computer program product, comprising instructions, i.e., software code portions, which, when executed on at least one processor, cause the at least one processor to carry out the actions described herein, as performed by the radio apparatus 41, and antenna arrangement 42. The respective computer program 1301, 1302 may be stored on a respective computer-readable storage medium 1303, 1304, shown in FIG. 4*b*, e.g. a disc or similar. The computer-readable storage medium 1303, 1304, having stored thereon the computer program 1301, 1302, may comprise the instructions which, when executed on at least one processor, cause the at least one processor to carry out the actions described herein, as performed by the radio apparatus 41 and antenna arrangement 42, respectively. In some embodiments, the computer-readable storage medium 1303, 1304 may be a non-transitory computer-readable storage medium.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a radio arrangement, for example.

Alternatively, several of the functional elements of the processing circuitry discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications receivers will appreciate the cost, performance, and maintenance trade-offs inherent in these design choices.

It will be appreciated that the foregoing description and the accompanying drawings represent non-limiting examples of the methods and apparatus taught herein. As such, the inventive apparatus and techniques taught herein are not limited by the foregoing description and accompanying drawings. Instead, the embodiments herein are limited only by the following claims and their legal equivalents.

The invention claimed is:

1. A radio arrangement for enabling communication in a wireless communication network, wherein the radio arrangement comprises at least two signal path configurations for transmitting and/or receiving signals to and/or from a radio device in the wireless communication network, a radio apparatus and an antenna arrangement connected to the radio apparatus, the radio arrangement being configured to:
   obtain, at the radio apparatus, an indication over a separate notification connection, which indication is at least one of: a non connection; a known resistor value; a known voltage; and a ground connection, and is indicating a configuration of the antenna arrangement connected to the radio apparatus; and
   select, for communication in the wireless communication network, a signal path configuration at the radio apparatus and/or the antenna arrangement of the at least two signal path configurations based on the obtained indication.

2. The radio arrangement according to claim 1, wherein the radio arrangement is configured to alter the signal path configuration in the radio apparatus and/or in the antenna arrangement based on one or more radio parameters, which radio parameter is at least one of the following: supported frequency configuration, operational frequency of the transmission and/or reception, signal strength of transmission and/or reception, and signal characteristics of transmission and/or reception.

3. The radio arrangement according to claim 1, wherein the radio arrangement is configured to signal, from the antenna arrangement, the indication to the radio apparatus.

4. The radio arrangement according to claim 1, wherein the radio arrangement is further configured to select signal path configuration at the antenna arrangement by transmitting a control signal to the antenna arrangement from the radio apparatus.

5. The radio arrangement according to claim 1, further comprising another antenna arrangement connected to the radio apparatus, and the radio arrangement being configured to select signal path configuration where transmissions are convoyed to the antenna arrangement connected to the radio apparatus and receptions are convoyed to the other antenna arrangement connected to the radio apparatus or vice versa.

6. A radio apparatus for enabling communication in a wireless communication network, the radio apparatus being configured to
   obtain an indication over a separate notification connection, which indication is at least one of: a non connection; a known resistor value; a known voltage; and a ground connection, and is indicating configuration of antenna arrangement connected to the radio apparatus; and
   select, for communication in the wireless communication network, a signal path configuration, at the radio apparatus and/or the antenna arrangement, of at least two signal path configurations for transmitting and/or receiving signals to and/or from a radio device in the wireless communication network, based on the obtained indication.

7. The radio apparatus according to claim 6, further being configured to select signal path configuration by controlling signal path in the antenna arrangement.

8. The radio apparatus according to claim 7, further being configured to control signal path configuration in the antenna arrangement by transmitting a control signal to the antenna arrangement.

9. The radio apparatus according to claim 6, being configured to obtain the indication by receiving a signal from the antenna arrangement.

10. The radio apparatus according to claim 9, wherein the signal indicates antenna polarization, antenna gain, signal paths dedicated to receiving and transmitting or a signal path combining the receiving and transmitting, and/or orientation of the antenna arrangement.

11. The radio apparatus according to claim 6, further being configured to select a signal path configuration for transmissions and a different signal path configuration for receptions.

12. The radio apparatus according to claim 11, being configured to be connected to another antenna arrangement, and the radio apparatus is configured to select signal path configuration where transmissions are convoyed to the antenna arrangement connected to the radio apparatus and receptions are convoyed to the other antenna arrangement connected to the radio apparatus or vice versa.

13. The radio apparatus according to claim 12, wherein the antenna arrangement comprises an external antenna and the other antenna arrangement comprises one or more internal antennas.

14. The radio apparatus according to claim 6, wherein the signal path configuration is altered in the radio apparatus based on one or more radio parameters, which is at least one of the following: supported frequency configuration; operational frequency of the transmission and/or reception; signal strength of transmission and/or reception; and signal characteristics of transmission and/or reception.

15. A method performed in a radio arrangement for enabling communication in a wireless communication network, wherein the radio arrangement comprises at least two signal paths for transmitting and/or receiving signals to and/or from a radio device in the wireless communication network, a radio apparatus and an antenna arrangement connected to the radio apparatus, the method comprising:
   obtaining, at the radio apparatus, an indication over a separate notification connection, which indication is at least one of: a non connection; a known resistor value; a known voltage; and a ground connection, and is indicating a configuration of the antenna arrangement connected to the radio apparatus; and
   selecting, for communication in the wireless communication network, a signal path configuration at the radio apparatus and/or the antenna arrangement of the at least two signal path configurations based on the obtained indication.

16. The method according to claim 15, wherein the signal path configuration is altered in the radio apparatus and/or in the antenna arrangement based on one or more radio parameters, which is at least one of the following: supported frequency configuration; operational frequency of the transmission and/or reception; signal strength of transmission and/or reception; and signal characteristics of transmission and/or reception.

17. The method according to claim 15, comprising
   signalling, from the antenna arrangement, the indication to the radio apparatus.

18. The method according to claim 15, wherein the selecting comprises selecting signal path configuration at the antenna arrangement by transmitting a control signal to the antenna arrangement from the radio apparatus.

19. The method according to claim 15, wherein the radio arrangement comprises another antenna arrangement connected to the radio apparatus, and the selecting comprises selecting the signal path configuration where transmissions are convoyed to the antenna arrangement connected to the radio apparatus and receptions are convoyed to the other antenna arrangement connected to the radio apparatus or vice versa.

20. A method performed in a radio apparatus for enabling communication in a wireless communication network, the method comprising
   obtaining an indication over a separate notification connection, which indication is at least one of: a non connection; a known resistor value; a known voltage; and a ground connection, and is indicating a configuration of an antenna arrangement connected to the radio apparatus; and
   selecting, for communication in the wireless communication network, a signal path configuration, at the radio apparatus and/or the antenna arrangement, of at least two signal path configurations for transmitting and/or receiving signals to and/or from a radio device in the wireless communication network, based on the obtained indication.

21. The method according to claim 20, wherein the selecting comprises selecting signal path configuration by controlling signal path in the antenna arrangement.

22. The method according to claim 21, wherein the selecting comprises controlling signal path in the antenna arrangement by transmitting a control signal to the antenna arrangement.

23. The method according to claim 20, wherein the obtaining comprises receiving a signal from the antenna arrangement.

24. The method according to claim 23, wherein the signal indicates antenna polarization, antenna gain, signal paths dedicated to receiving and transmitting or a signal path combining the receiving and transmitting, and/or orientation of the antenna arrangement.

25. The method according to claim 20, wherein the selecting comprises selecting a signal path configuration for transmissions and a different signal path configuration for receptions.

26. The method according to claim 25, wherein another antenna arrangement is connected to the radio apparatus, and the selecting comprises selecting a signal path configuration where transmissions are convoyed to the antenna arrangement connected to the radio apparatus and receptions are convoyed to the other antenna arrangement connected to the radio apparatus or vice versa.

27. The method according to claim 26, wherein the antenna arrangement comprises an external antenna and the other antenna arrangement comprises one or more internal antennas.

28. The method according to claim 20, wherein the selecting comprises altering signal path configuration based on one or more radio parameters, which is at least one of the following: supported frequency configuration; operational frequency of the transmission and/or reception; signal strength of transmission and/or reception; and signal characteristics of transmission and/or reception.

* * * * *